United States Patent
Gonzaga

(10) Patent No.: US 11,239,729 B2
(45) Date of Patent: Feb. 1, 2022

(54) TWO-STROKE ELECTROMAGNETIC ENGINE

(71) Applicant: Ernesto Aguilar Gonzaga, Milpitas, CA (US)

(72) Inventor: Ernesto Aguilar Gonzaga, Milpitas, CA (US)

(*) Notice: Subject to any disclaimer, the term of this patent is extended or adjusted under 35 U.S.C. 154(b) by 257 days.

(21) Appl. No.: 16/676,431

(22) Filed: Nov. 6, 2019

(65) Prior Publication Data

US 2020/0144889 A1    May 7, 2020

Related U.S. Application Data

(60) Provisional application No. 62/756,327, filed on Nov. 6, 2018.

(51) Int. Cl.
| | | |
|---|---|---|
| *H02K 7/075* | (2006.01) | |
| *H02K 7/02* | (2006.01) | |
| *H02K 3/50* | (2006.01) | |
| *H02K 7/07* | (2006.01) | |
| *H02K 11/30* | (2016.01) | |

(52) U.S. Cl.
CPC ............. *H02K 7/075* (2013.01); *H02K 3/50* (2013.01); *H02K 7/02* (2013.01); *H02K 7/07* (2013.01); *H02K 11/30* (2016.01); *H02K 2203/09* (2013.01)

(58) Field of Classification Search
CPC .. H02K 3/50; H02K 7/02; H02K 7/07; H02K 7/075; H02K 11/30; H02K 2203/09

USPC ......... 310/12.12, 37, 71, 75 R, 79, 118, 152, 310/153

See application file for complete search history.

(56) References Cited

U.S. PATENT DOCUMENTS

| | | | |
|---|---|---|---|
| 10,900,454 B1* | 1/2021 | Fliearman | F16H 61/28 |
| 2002/0121815 A1* | 9/2002 | Sullivan | H02K 37/10 310/33 |
| 2005/0116567 A1* | 6/2005 | Limb | H02K 53/00 310/152 |
| 2008/0197721 A1* | 8/2008 | Reyes | H02K 33/02 310/24 |
| 2010/0059004 A1* | 3/2010 | Gill | F02M 69/043 123/90.11 |
| 2010/0071636 A1* | 3/2010 | Elmaleh | H02K 7/14 123/2 |
| 2012/0007448 A1* | 1/2012 | Gosvener | H02K 7/075 310/23 |
| 2012/0007449 A1* | 1/2012 | Gosvener | H02K 33/16 310/23 |

(Continued)

*Primary Examiner* — Tulsidas C Patel
*Assistant Examiner* — Rashad H Johnson

(57) ABSTRACT

A two-stroke electromagnetic has a busbar, a magnetic field generator, a piston, a crankshaft, a connecting linkage, and a power source. The magnetic field generator may be a permanent magnet or a solenoid. The power source provides electric current to the busbar and the solenoid. The piston is positioned concentrically with the busbar, which produces a magnetic field upon receiving current flow from the power source. The magnetic field generator is connected atop the piston and oriented orthogonal to the magnetic field generated by current flow through the busbar, so that interaction of the two magnetic fields produces a downward force on the piston, which is connected to the crankshaft by the connecting linkage.

10 Claims, 5 Drawing Sheets

(56) References Cited

U.S. PATENT DOCUMENTS

| | | | | |
|---|---|---|---|---|
| 2012/0032441 | A1* | 2/2012 | Engineer | B60L 3/0061 |
| | | | | 290/31 |
| 2012/0098357 | A1* | 4/2012 | Hunstable | H02K 35/04 |
| | | | | 310/20 |
| 2012/0242174 | A1* | 9/2012 | Wilson, II | H02K 35/04 |
| | | | | 310/23 |
| 2015/0188400 | A1* | 7/2015 | Kemp | H02K 53/00 |
| | | | | 310/74 |
| 2017/0025938 | A1* | 1/2017 | Ishak | H02K 99/20 |
| 2020/0259393 | A1* | 8/2020 | Brandt | H02K 33/16 |
| 2020/0331560 | A1* | 10/2020 | Elie | B62M 23/02 |
| 2021/0017904 | A1* | 1/2021 | Agnew | F16C 7/06 |
| 2021/0018036 | A1* | 1/2021 | Agnew | F16C 7/06 |
| 2021/0135511 | A1* | 5/2021 | Gaither | H02K 21/12 |

* cited by examiner

TWO-STROKE ELECTROMAGNETIC ENGINE

The current application claims a priority to the U.S. Provisional Patent application Ser. No. 62/756,327 filed on Nov. 6, 2018.

FIELD OF THE INVENTION

The present invention relates generally to production of mechanical power. More particularly, the present invention relates to an electromagnetic engine.

BACKGROUND OF THE INVENTION

Electricity generation is the process of generating electric power from sources of primary energy. For utilities in the electric power industry, it is the stage prior to its delivery to end users (transmission, distribution, etc.) or its storage (using, for example, the pumped-storage method).

A characteristic of electricity is that it is not freely available in nature in large amounts, so it must be produced. Production is carried out in power stations (also called "power plants"). Electricity is most often generated at a power plant by electromechanical generators, primarily driven by heat engines fueled by combustion or nuclear fission but also by other means such as the kinetic energy of flowing water and wind. Other energy sources include solar photovoltaics and geothermal power.

An engine or motor is a machine designed to convert one form of energy into mechanical energy. Heat engines, like the internal combustion engine, burn a fuel to create heat which is then used to do work. Electric motors convert electrical energy into mechanical motion, pneumatic motors use compressed air, and clockwork motors in wind-up toys use elastic energy. In biological systems, molecular motors, like myosins in muscles, use chemical energy to create forces and eventually motion.

Engines are most commonly used in applications such as vehicles, where stored energy in the form of combustible fuel or electricity is used to create mechanical power in order to propel the vehicle. In recent years, electric vehicles have increased significantly in popularity due to technological improvements and an increased focus on renewable energy.

Electromagnetic propulsion (EMP) is the principle of accelerating an object by the utilization of a flowing electrical current and magnetic fields. The electrical current is used to either create an opposing magnetic field, or to charge a field, which can then be repelled. When a current flows through a conductor in a magnetic field, an electromagnetic force known as a Lorentz force pushes the conductor in a direction perpendicular to the conductor and the magnetic field. This repulsing force is what causes propulsion in a system designed to take advantage of the phenomenon. The term electromagnetic propulsion (EMP) can be described by its individual components: electromagnetic—using electricity to create a magnetic field, and propulsion—the process of propelling something. When a fluid (liquid or gas) is employed as the moving conductor, the propulsion may be termed magnetohydrodynamic drive. One key difference between EMP and propulsion achieved by electric motors is that the electrical energy used for EMP is not used to produce rotational energy for motion, though both use magnetic fields and a flowing electrical current. EMP has various useful applications, particularly including usage in vehicles. Replacing a typical internal combustion engine in a vehicle with an EMP engine has various advantages, which may include reduced weight, not only of the engine but of fuel storage, and being a renewable energy source in comparison to fossil fuels. Furthermore, recharging an electric vehicle's electrical power source is associated with less cost to the consumer than purchasing fossil fuel.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

Figure 1:
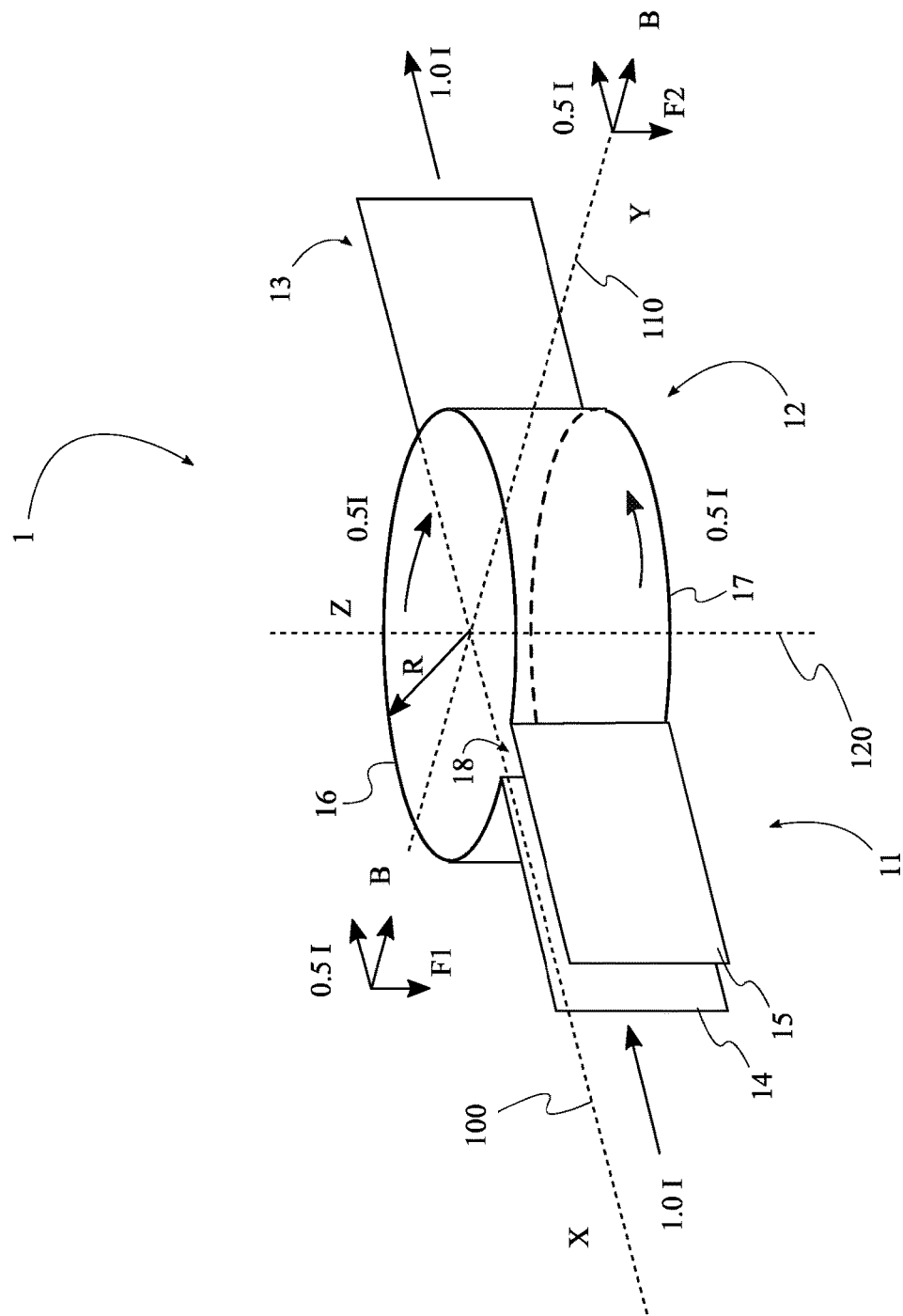
FIG. 1 is an illustration of the busbar of the present invention in accordance with some embodiments.
Figure 2:
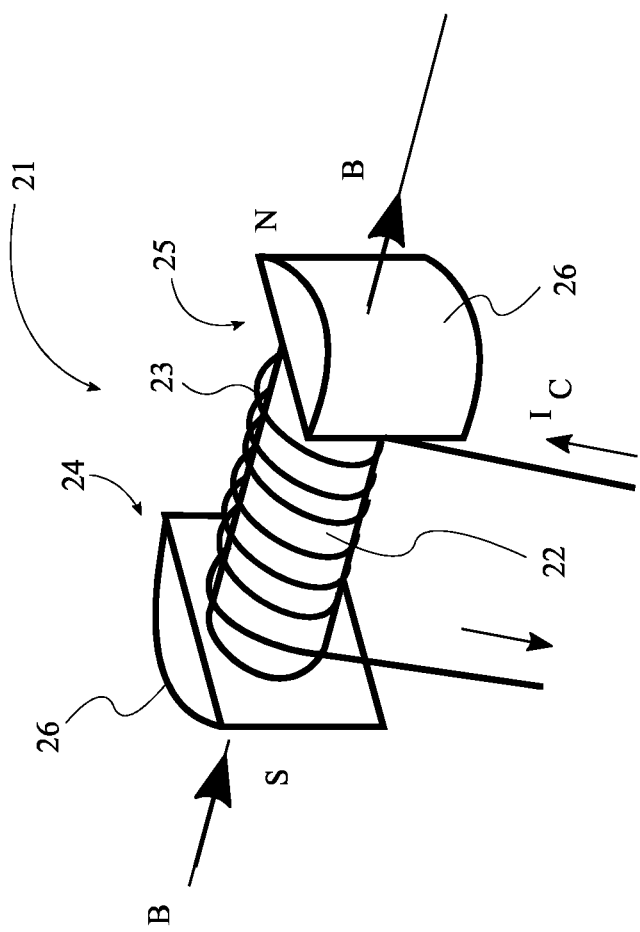
FIG. 2 is an illustration of the solenoid of the present invention in accordance with some embodiments.
Figure 3:
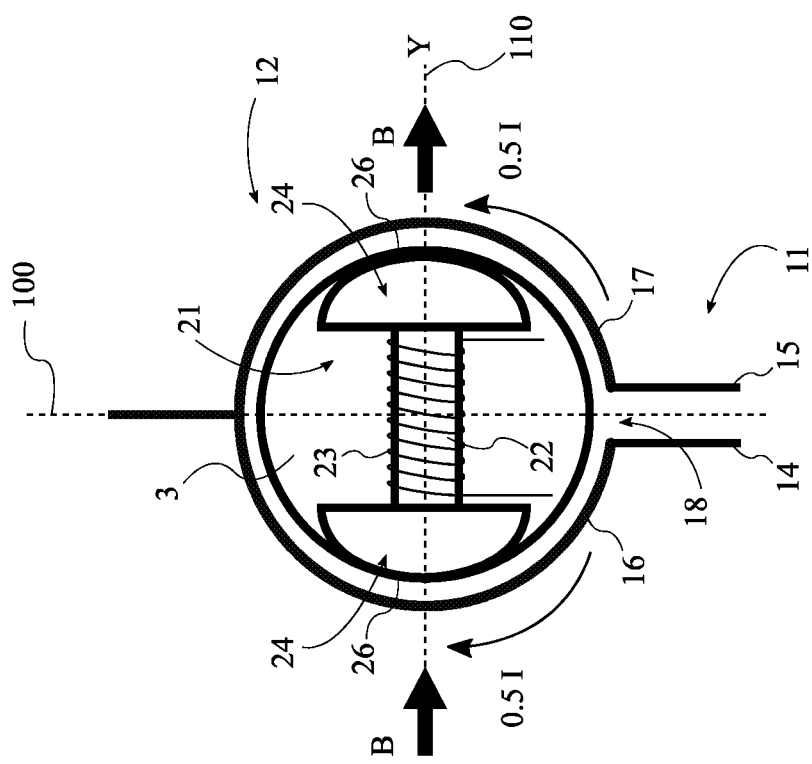
FIG. 3 is a top view of the busbar, solenoid and piston arrangement of the present invention in accordance with some embodiments.
Figure 5:
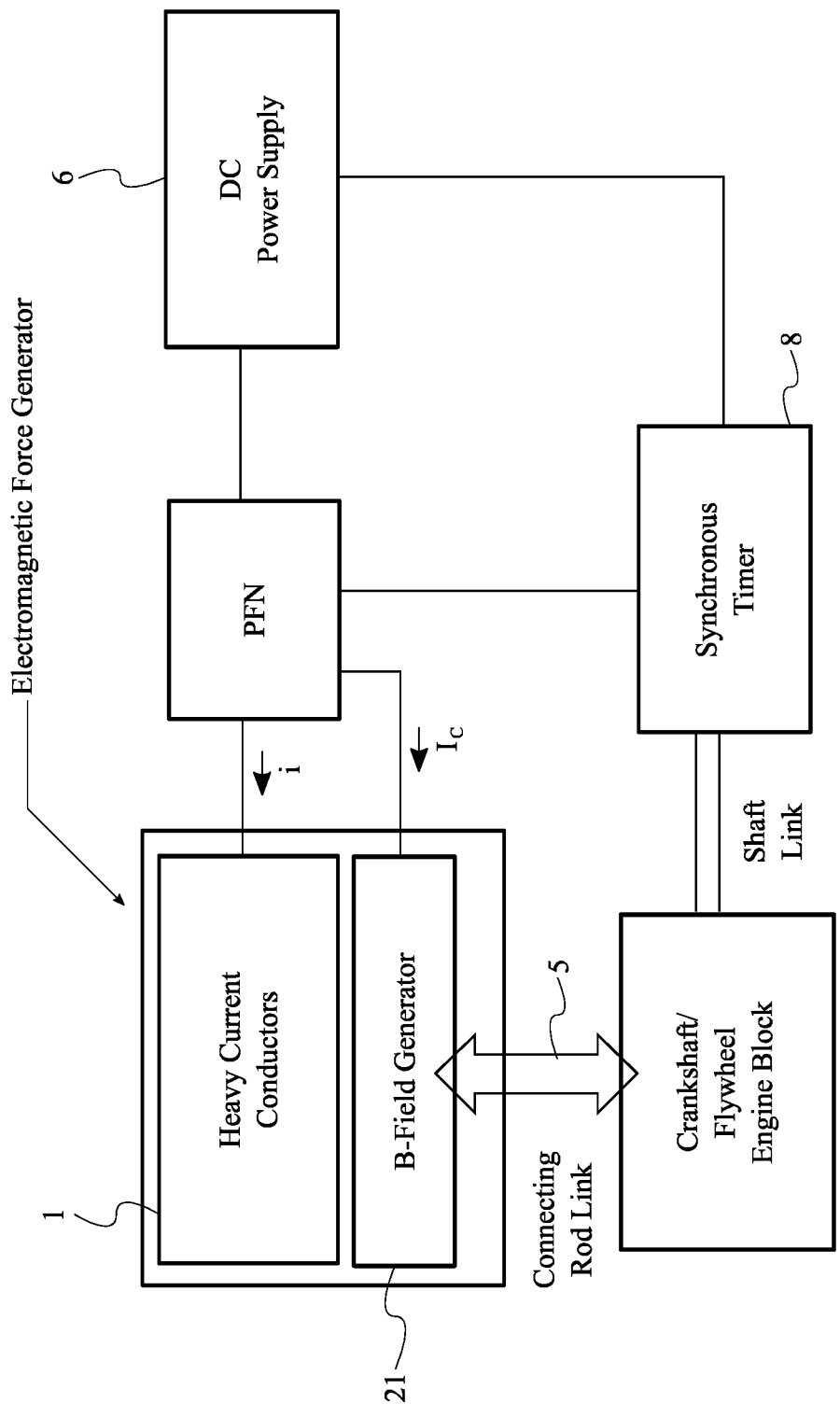
FIG. 5 is a block diagram of the present invention in accordance with some embodiments.

The present invention is a two-stroke electromagnetic engine harnessing the interaction between two electromagnetic fields in order to drive a piston 3. In general, referring to FIGS. 1-3, the present invention comprises a busbar 1, a magnetic field generator, a piston 3, a crankshaft 4, a connecting linkage 5, and a power source 6. FIG. 5 shows a general block diagram of the present invention.

The busbar 1 is an electrical conductor configured to conduct a current I in order to produce a first magnetic field. The magnetic field generator produces a second magnetic field orthogonal to the first magnetic field, resulting in an electromagnetic force. The change in magnitude of the electromagnetic force in an electromagnetic engine described herein is accomplished by varying bus-bar current, magnetic induction, effective bus bar length, and directional angle θ between current and magnetic induction. Manipulation of these variables, single or in combinations, make possible control of engine speed and power output. The range of values for θ is zero degree up to 90 degrees. Electromagnetic force is zero for θ equals zero and maximum for θ equals 90 degrees. Regardless of the magnitudes of current and magnetic induction the electromagnetic force is always perpendicular to the plane of bus bar and magnetic induction. Preferably, the busbar 1 is generally circular in shape to achieve proper interaction of magnetic induction.

In some embodiments of the present invention, the magnetic field generator may be a permanent magnet. In some embodiments, the magnetic field generator may be a solenoid 21. In various embodiments, the power source 6 may comprise any suitable source of electrical energy, such as, but not limited to, a DC power supply, a battery, or another type of electrical power source 6.

The piston 3 is operatively connected to the crankshaft 4 through the connecting linkage 5, such that the piston 3 is configured to turn the crankshaft 4 through displacement of the piston 3 along a piston axis 120. Furthermore, in the preferred embodiment, a flywheel 7 may be further comprised and axially connected to the crankshaft 4. This is a common configuration for piston-driven crankshafts which facilitates continuous axial rotation of the crankshaft 4 due to the angular momentum stored by the flywheel 7. The magnetic field generator is centrally connected atop the piston 3, and the piston 3 is positioned relative to the busbar 1 so that a magnetic field generated by current flow through the busbar 1 will interact with a magnetic field of the magnetic field generator in order to produce a magnetic force on the piston 3, driving the piston 3 along the piston axis 120 and turning the crankshaft 4.

In the preferred embodiment, the busbar 1 comprises an input busbar portion 11, an intermediate busbar portion 12, and an output busbar portion 13. In order to properly generate a magnetic field through current flow through the busbar 1, in the preferred embodiment the intermediate busbar portion 12 is laterally symmetrical about a longitudinal axis 100 and longitudinally symmetrical about a lateral axis 110, wherein the intermediate busbar portion 12 has a specified radial geometry. The longitudinal axis 100 and the lateral axis 110 are perpendicular to each other; furthermore, the piston axis 120 intersects and is perpendicular to both the lateral axis 110 and the longitudinal axis 100. The longitudinal axis 100, the lateral axis 110, and the piston axis 120 are defined herein in order to define the orientation and position of the components of the present invention relative to each other, and should not be considered limiting otherwise.

The input busbar portion 11 is terminally connected to the intermediate busbar portion 12, and the output busbar portion 13 is terminally connected to the intermediate busbar portion 12 longitudinally opposite the input busbar portion 11 along the intermediate busbar portion 12, such that the busbar 1 is configured to direct electrical current received from the power source 6 serially through the input busbar portion 11, the intermediate busbar portion 12, and the output busbar portion 13. Thus, current flow through the busbar 1 produces a magnetic field that interacts with the magnetic field of the magnetic field generator in order to produce an electromagnetic force on the piston 3.

The piston 3 is concentrically positioned with the intermediate busbar portion 12, wherein the piston 3 is configured to be linearly displaced along the piston axis 120, and wherein the piston 3 is displaced between a top dead center (TDC) position 200 and a bottom dead center (BDC) position 210. In the TDC position 200, the piston 3 is furthest from the crankshaft 4 and closest to the busbar 1, while in the BDC position 210, the piston 3 is furthest from the busbar 1 and closest to the crankshaft 4. The magnetic field generator is oriented laterally in order for the magnetic field produced by the magnetic field generator to be orthogonal to the magnetic field produced by current flowing through the busbar 1, and thus the force produced on the magnetic field generator, and therefore the piston 3, will be aligned with the piston axis 120. Furthermore, the magnetic field generator, whether a permanent magnet or a solenoid 21, is laterally and longitudinally centered within the intermediate busbar portion 12 to ensure proper geometrical interaction of the magnetic fields.

The vertical movement of the magnetic field generator will be confined in a cylindrical space concentric to the circular (or other geometrical configuration) shape of the conductor sheet. In this cylindrical space the coil will be moving with a maximum stroke and then return back to the initial position to be subjected to the same force that pushed it down previously. This reciprocating motion will then be repeated as long as I and B interaction is maintained. This interaction will occur only when the solenoid 21 or part of it is within the confines of the busbar 1. Once the magnetic induction B is out of the influence of the busbar 1 current the electromagnetic force will be reduced to zero and will be shut off. The connecting rod makes possible linear motion of the piston/solenoid core transformed into rotary motion by the crankshaft/flywheel combination located below the busbar 1.

In embodiments where the magnetic field generator is a solenoid 21, the solenoid 21 is electrically connected to the power source 6 and comprises a ferromagnetic core 22 and a coil winding 23. More specifically, the coil winding 23 is electrically connected to the power source 6, and the ferromagnetic core 22 is oriented laterally. The coil winding 23 is wound along the ferromagnetic core 22 and traverses along the ferromagnetic core 22.

In the preferred embodiment, the intermediate busbar portion 12 has radial geometry with a specified radius R. More specifically, in some embodiments the intermediate busbar portion 12 may be generally annular in shape, though different geometries may be comprised by the intermediate busbar portion 12 as useful and applicable.

Furthermore, in the preferred embodiment, the input busbar portion 11 comprises a first input busbar portion 14 and a second input busbar portion 15, while the intermediate busbar portion 12 comprises a first intermediate busbar portion 16, a second intermediate busbar portion 17, and a gap 18. The gap 18 is positioned on the longitudinal axis 100 adjacent to the input busbar portion 11, such that the first input busbar portion 14 and the second input busbar portion 15 are positioned laterally opposite each other across the gap 18. The first intermediate busbar portion 16 is connected between the first input busbar portion 14 and the output busbar portion 13, and similarly, the second intermediate busbar portion 17 is connected between the second input busbar portion 15 and the output busbar portion 13. Therefore, current received from the power source 6 through the input busbar portion 11 is split into halves and transferred equally along the first intermediate busbar portion 16 and the second intermediate busbar portion 17 to the output busbar portion 13. This arrangement ensures that the force generated by the interaction of the two magnetic fields is directed along the piston axis 120 for efficient force transfer. Furthermore, in some embodiments, the first intermediate busbar portion 16 and the second intermediate busbar portion 17 are each an arc with a specified radius R, though in different embodiments, the geometry of the first intermediate busbar portion 16 and the second intermediate busbar portion 17 may vary as desired and useful.

In some embodiments, the magnetic field generator may be a solenoid 21 comprising a first pole end 24 and a second pole end 25. The ferromagnetic core 22 of the solenoid 21 is terminally connected between the first pole end 24 and the second pole end 25, such that the coil winding 23 traverses along the ferromagnetic core 22 between the first pole end 24 and the second pole end 25. Furthermore, the first pole end 24 and the second pole end 25 each comprise an outer pole face 26. The outer pole face 26 of the first pole end 24 is positioned opposite the ferromagnetic core 22 along the first pole end 24, and the outer pole face 26 of the second pole end 25 is positioned opposite the ferromagnetic core 22 along the second pole end 25. Alternatively stated, the outer pole face 26s are the lateral outermost elements of the solenoid 21 and conform to the geometry of the intermediate busbar portion 12.

In the preferred embodiment, the outer pole face 26 of the first pole end 24 and the outer pole face 26 of the second pole end 25 should each match the geometry of the intermediate busbar portion 12 in order to effectively manage the interaction of the two magnetic fields. To this end, the outer pole face 26 of the first pole end 24 and the second pole end 25 each have convex curvature with radius R, corresponding to the specified radius R of the first intermediate busbar portion 16 and the second intermediate busbar portion 17. It will be seen that the orthogonal relationship between a current and a magnetic induction is maintained along the curvature length of the solenoid 21 pole faces. For both S pole face and N pole face the net electromagnetic force produced is directed in only one direction, i.e. along the piston axis 120. With the conductor sheet, current is split equally between the first input busbar portion 14 and the second input busbar portion 15, and a balanced force should be expected to push down the entire structure of the ferromagnetic core 22 solenoid 21 firmly attached on top of the piston 3. Since both up and down directions are possible, in this concept force direction is preferentially vertical downward only. Relative directions of current I and magnetic induction B will determine the downward direction of the force pushing solenoid 21 winding and piston 3 assembly. This is an action similar to the force from carbon fuel combustion pushing piston 3 downward in the case of an internal combustion engine (ICE).

In the preferred embodiment, a means of controlling current flow to the solenoid 21 is desired. To this end, a synchronous timing mechanism 8 may be comprised. The synchronous timing mechanism 8 is operatively engaged with the magnetic field generator, such that the synchronous timing mechanism 8 is configured to increase electrical current flow to the magnetic field generator when the piston 3 is in the TDC position 200, and the synchronous timing mechanism 8 is configured to decrease electrical current flow to the magnetic field generator (more specifically, to the solenoid 21) when the piston 3 is in the BDC position 210. More specifically, in some embodiments, the synchronous timing mechanism 8 may be configured to switch on electrical current flow to the magnetic field generator when the piston 3 is in the TDC position 200, and to switch off electrical current flow to the magnetic field generator when the piston 3 is in the BDC position 210. In various embodiments, the specific nature of the synchronous timing mechanism 8 may vary. In some embodiments, a decoder may be utilized to detect the position of the piston 3. The decoder may comprise an optical sensor, a magnetic sensor, or any applicable sensor. It is further contemplated that any other suitable means may be implemented in the synchronous timing mechanism 8. For example, if desired, the piston 3 may come into contact with a physical switch or cause a circuit to complete at TDC and BDC in order to indicate the piston's 3 aposition and change current flow to the solenoid 21.

Figure 4:
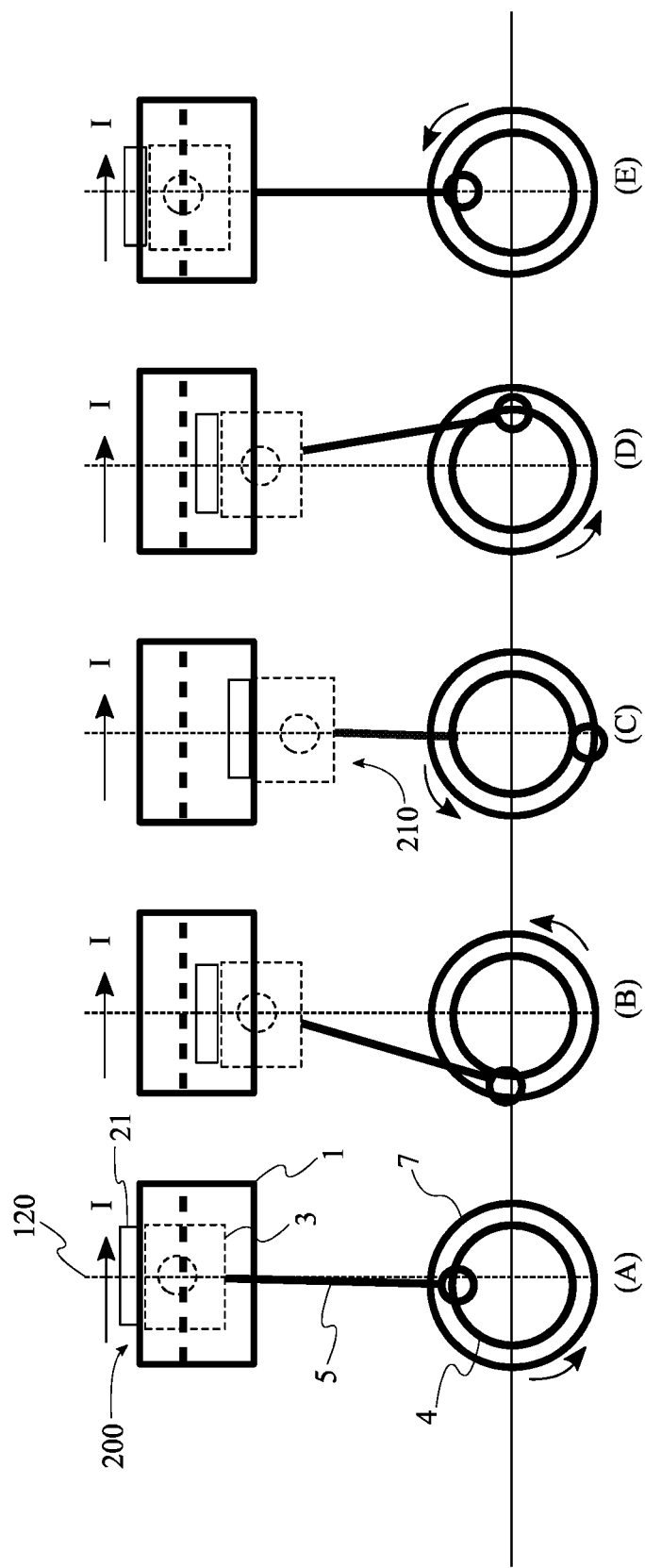
FIG. 4 is an illustration of a power cycle of the present invention.

Referring to FIG. 4, the operational cycle of the present invention is described as follows:

(A) Current I flows in stationary bus-bar conductor while current $I_C$ flows in mobile solenoid 21 coil to generate magnetic induction B. Interaction of I and B results to generation of force F pushing the connecting linkage 5 downward, creating rotary motion through the crank-shaft/flywheel 7 combination. The crankshaft 4 and flywheel 7 turn counterclockwise shown as an example.

(B) The solenoid 21 coil assembly rigidly attached to piston 3 moves out of the circular bus bar conductor, current $I_C$ is switched off, and the crankshaft 4 keeps turning due to the inertial effect of the flywheel 7.

(C) The solenoid 21 coil is completely out of the circular bus bar conductor, $I_C$ is reduced if not zeroed, and the crankshaft 4 continues turning and the solenoid 21 coil will start moving back to circular bus-bar conductor.

(D) Solenoid 21 coil starts getting inside the circular bus bar conductor but $I_C$ is still zero and crankshaft 4 rotation continues.

(E) Sequence completes generating a power cycle. Current $I_C$ will be switched on to enable the solenoid 21 to generate magnetic field induction B that will interact with current I. This interaction produces electromagnetic force F on the solenoid 21, and therefore the piston 3, initiating repeat of the power cycle.

The above discussion covers one of the several methods of implementing power cycle sequencing. This method utilizes keeping the current I in the circular bus bar conductor constant in magnitude. Only the flow of current through the ferromagnetic solenoid 21 will be synchronized with the motion of the solenoid 21 in and out of the cylindrical confinement of the circular bus bar conductor. Several stages of magnitude level of the bus bar conductor current I can be incorporated to change power delivery and engine speed. Hence power output and speed can also be controlled through variation of bus bar conductor current I and/or coil winding 23 current $I_C$. Power transfer can be conveyed by direct shaft or by means of gear or chain drive integrated to the crankshaft 4 system. Each cycle generates power for motive action. The system of the present invention is a two-stroke engine.

Although the invention has been explained in relation to its preferred embodiment, it is to be understood that many other possible modifications and variations can be made without departing from the spirit and scope of the invention as hereinafter claimed.

What is claimed is:

1. A two-stroke electromagnetic engine comprising:
   a busbar;
   a magnetic field generator;
   a piston;
   a crankshaft;
   a connecting linkage;
   a power source;
   the power source being electrically connected to the busbar;
   the busbar comprising an input busbar portion, an intermediate busbar portion, and an output busbar portion;
   the intermediate busbar portion being laterally symmetrical about a longitudinal axis and longitudinally symmetrical about a lateral axis, wherein the intermediate busbar portion has a specified radial geometry, wherein the longitudinal axis and the lateral axis are perpendicular to each other, and wherein a piston axis intersects and is perpendicular to both the lateral axis and the longitudinal axis;

the input busbar portion being terminally connected to the intermediate busbar portion;

the output busbar portion being terminally connected to the intermediate busbar portion longitudinally opposite the input busbar portion along the intermediate busbar portion, wherein the busbar is configured to direct electrical current received from the power source serially through the input busbar portion, the intermediate busbar portion, and the output busbar portion;

the piston being concentrically positioned with the intermediate busbar portion, wherein the piston is configured to be linearly displaced along the piston axis, and wherein the piston is displaced between a top dead center (TDC) position and a bottom dead center (BDC) position;

the magnetic field generator being centrally connected atop the piston, wherein the magnetic field generator is laterally and longitudinally centered within the intermediate busbar portion;

the magnetic field generator being oriented laterally; and the piston being operatively connected to the crankshaft through the connecting linkage, wherein the piston is configured to turn the crankshaft through displacement of the piston along the piston axis.

2. The two-stroke electromagnetic engine as claimed in claim 1 comprising:
the magnetic field generator being a permanent magnet.

3. The two-stroke electromagnetic engine as claimed in claim 1 comprising:
the magnetic field generator being a solenoid;
the solenoid being electrically connected to the power source;
the solenoid comprising a ferromagnetic core and a coil winding;
the ferromagnetic core being oriented laterally; and
the coil winding being wound along the ferromagnetic core and traversing along the ferromagnetic core.

4. The two-stroke electromagnetic engine as claimed in claim 1 comprising:
a flywheel; and
the flywheel being axially connected to the crankshaft.

5. The two-stroke electromagnetic engine as claimed in claim 1 comprising:
the intermediate busbar portion having radial geometry with a specified radius R.

6. The two-stroke electromagnetic engine as claimed in claim 1 comprising:
the input busbar portion comprising a first input busbar portion and a second input busbar portion;
the intermediate busbar portion comprising a first intermediate busbar portion and a second intermediate busbar portion;
the intermediate busbar portion comprising a gap;
the gap being positioned on the longitudinal axis adjacent to the input busbar portion;
the first input busbar portion and the second input busbar portion being positioned laterally opposite each other across the gap;
the first intermediate busbar portion being connected between the first input busbar portion and the output busbar portion; and
the second intermediate busbar portion being connected between the second input busbar portion and the output busbar portion.

7. The two-stroke electromagnetic engine as claimed in claim 6 comprising:
the first intermediate busbar portion and the second intermediate busbar portion each being an arc with a specified radius R.

8. The two-stroke electromagnetic engine as claimed in claim 1 comprising:
the magnetic field generator being a solenoid and comprising a first pole end and a second pole end;
the ferromagnetic core being terminally connected between the first pole end and the second pole end;
the coil winding traversing along the ferromagnetic core between the first pole end and the second pole end;
the first pole end and the second pole end each comprise an outer pole face;
the outer pole face of the first pole end being positioned opposite the ferromagnetic core along the first pole end;
the outer pole face of the second pole end being positioned opposite the ferromagnetic core along the second pole end; and
the outer pole face of the first pole end and the second pole end having convex curvature with radius R.

9. The two-stroke electromagnetic engine as claimed in claim 1 comprising:
a synchronous timing mechanism; and
the synchronous timing mechanism being operatively engaged with the magnetic field generator,
wherein the synchronous timing mechanism is configured to switch on electrical current flow to the magnetic field generator when the piston is in the TDC position, and
wherein the synchronous timing mechanism is configured to switch off electrical current flow to the magnetic field generator when the piston is in the BDC position.

10. The two-stroke electromagnetic engine as claimed in claim 1 comprising:
a synchronous timing mechanism; and
the synchronous timing mechanism being operatively engaged with the magnetic field generator,
wherein the synchronous timing mechanism is configured to increase electrical current flow to the magnetic field generator when the piston is in the TDC position, and
wherein the synchronous timing mechanism is configured to decrease electrical current flow to the magnetic field generator when the piston is in the BDC position.

* * * * *